(12) United States Patent
Kopp

(10) Patent No.: US 8,447,150 B2
(45) Date of Patent: May 21, 2013

(54) STRUCTURE AND METHOD FOR ALIGNING AN OPTICAL FIBER AND A SUBMICRONIC WAVEGUIDE

(75) Inventor: Christophe Kopp, Fontanil-Cornillon (FR)

(73) Assignee: Commissariat a l'Energie Atomique et Aux Energies Alternatives Batiment le Ponant D, Paris (FR)

( * ) Notice: Subject to any disclaimer, the term of this patent is extended or adjusted under 35 U.S.C. 154(b) by 288 days.

(21) Appl. No.: 12/822,362

(22) Filed: Jun. 24, 2010

(65) Prior Publication Data

US 2010/0329603 A1 Dec. 30, 2010

(30) Foreign Application Priority Data

Jun. 26, 2009 (FR) .................. 09 54388

(51) Int. Cl.
*G02B 6/34* (2006.01)
*G02B 6/12* (2006.01)

(52) U.S. Cl.
USPC .............................. 385/37; 385/14

(58) Field of Classification Search
None
See application file for complete search history.

(56) References Cited

U.S. PATENT DOCUMENTS 6,064,783 A * 5/2000 Congdon et al. .............. 385/15
7,024,066 B1 4/2006 Malendevich et al.

FOREIGN PATENT DOCUMENTS

EP 1 353 200 A2 10/2003
FR 2 922 031 4/2009

OTHER PUBLICATIONS

P. Velha, et al., "Ultracompact silicon-on-insulator ridge-waveguide mirrors with high reflectance", *Applied Physics Letters*, vol. 89, Issue 17, pp. 171121(1)-171121(3), (2006).
French Search Report received in French priority Application No. 09/54388., dated Feb. 8, 2010.

* cited by examiner

*Primary Examiner* — Omar Rojas
(74) *Attorney, Agent, or Firm* — Vedder Price PC

(57) ABSTRACT

An integrated optical circuit including an operational submicronic waveguide associated with an operational grating intended for the coupling with an optical fiber, further including an alignment grating, identical to the operational grating, associated with a blind waveguide and arranged at a known distance from the operational grating.

8 Claims, 4 Drawing Sheets

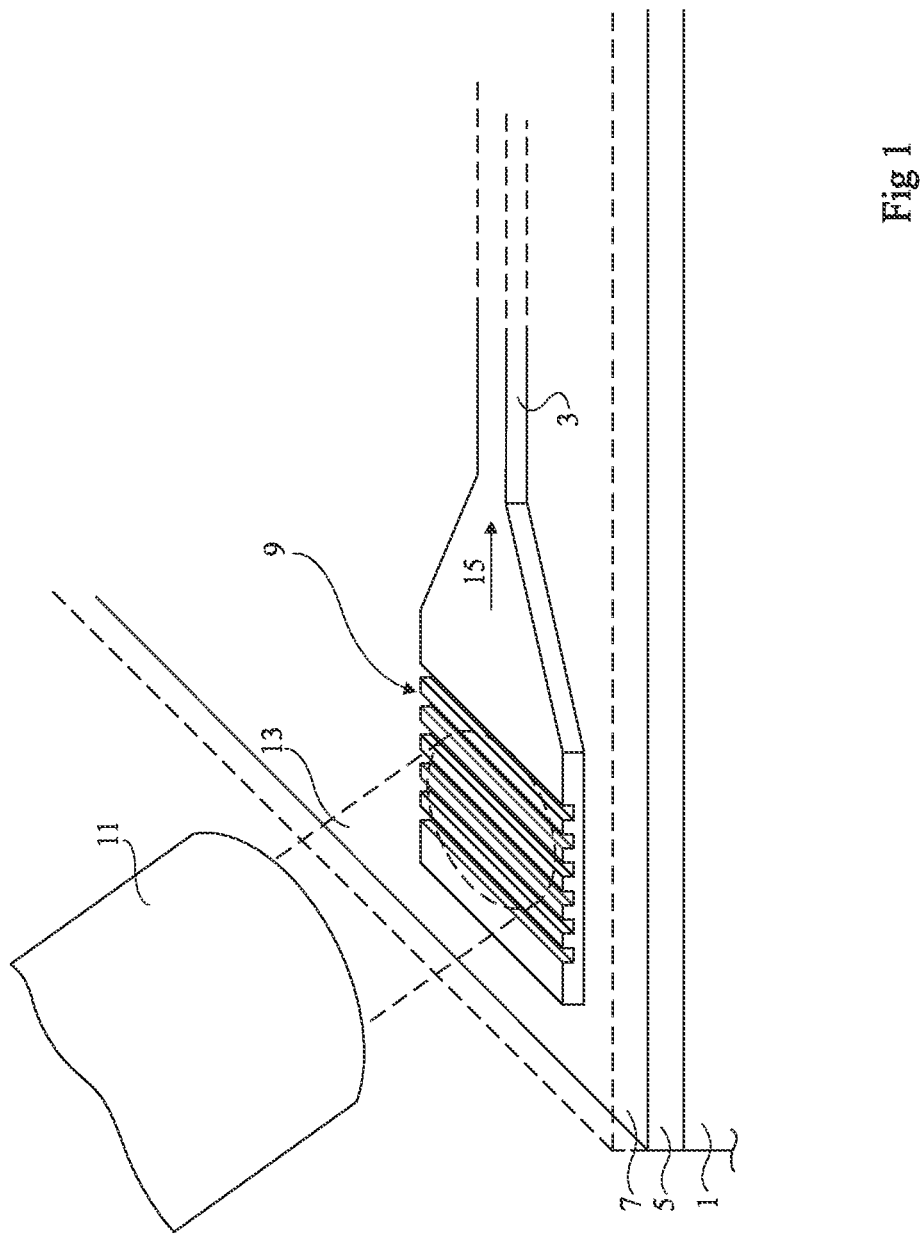

STRUCTURE AND METHOD FOR ALIGNING AN OPTICAL FIBER AND A SUBMICRONIC WAVEGUIDE

BACKGROUND OF THE INVENTION

1. Field of the Invention

The present invention relates to an integrated optical circuit. More specifically, the present invention relates to a device and a method enabling to align an optical fiber and a submicronic waveguide of an integrated optical circuit.

2. Discussion of the Related Art

Integrated optical circuits are being increasingly used in the field of telecommunications, especially for the transmission, processing, or storage of data. Integrated optical circuits may have many functions, such as multiplexing, demultiplexing, modulation, demodulation, spectral routing, amplification, accumulation, filtering, or a resonator function.

Integrated optical or optoelectronic circuits are generally formed in and on semiconductors wafers similar to those used in microelectronics. An integrated optical circuit comprises one or several elementary optical components processing one or several light beams, the light beams being conveyed between the elementary optical components by optical waveguides. An integrated optoelectronic circuit further comprises one or several electronic components.

The integration of an increasing number of functions on same chip requires a miniaturization of the optical components and of the associated waveguides. When the waveguides have dimensions below one micrometer, one can speak of submicronic or nanometric waveguides. Currently, such waveguides may have cross-section areas on the order of 0.5×0.2 $\mu m^2$ for waves in the visible and close infrared field and transmit optical modes of similar dimensions.

For medium and long-distance transmissions, that is, from a few meters to several kilometers, optical fibers are the privileged optical transport means. An optical fiber usable in the visible and close infrared range transmits or guides an optical mode with a diameter ranging between 10 $\mu$m and a few tens of micrometers. It is accordingly necessary to use specific devices for coupling the optical fibers with the submicronic waveguides so that the light beams can travel correctly between these structures guiding optical modes of different dimensions.

FIG. 1 illustrates a known coupling grating device between an optical fiber and a submicronic waveguide of an integrated optical circuit. Of course, this coupling device only takes up a small portion of an integrated circuit chip. Above a support 1, for example, made of silicon, is formed a submicronic waveguide comprising a core 3 surrounded with lower and upper layers 5 and 7 of different indexes forming an optical cladding. Lower and upper layers 5 and 7 are for example made of silicon oxide and core 3 is for example made of silicon. The optical index difference between the materials of the core and of the cladding of the waveguide enables to confine light beams within the core of waveguide 3. This waveguide extends towards integrated optical circuits, not shown.

A diffraction grating 9 is formed at the surface of core 3. Diffraction grating 9 is for example formed of an assembly of parallel grooves. It may be provided, as shown, to widen the submicronic waveguide at the level of the diffraction grating to substantially reach the dimensions of the optical mode of the optical fiber to enable a better coupling. An optical fiber 11 having one of its ends placed in front of diffraction grating 9 delivers a light beam 13 towards diffraction grating 9. When optical fiber 11 properly illuminates diffraction grating 9 (good alignment), a light beam (arrow 15) travels through the waveguide. It should be noted that the structure of FIG. 1 may also be used to transmit a light beam originating from an integrated optical circuit to optical fiber 11 via the core of waveguide 3.

For an optical circuit to operate properly and for the light to be coupled between an optical fiber and a submicronic waveguide of an integrated optical circuit, the optical fiber must be perfectly aligned with the coupling device associated therewith.

Several methods have been provided to perform this alignment. For example, the integrated optical circuit may be provided to deliver a light beam to the coupling device, and the alignment of the optical fiber is obtained when the amount of light that it conveys is maximum. It may also be provided to form a photodetector device in the integrated optical circuit to detect the position of the fiber enabling to convey the maximum light intensity towards the optical circuit.

However, such methods have the disadvantage of requiring the presence, in any integrated optical circuit, of elements dedicated to the alignment of the optical fibers, for example, illumination devices or photodetectors. Further, in the alignment, the integrated optical circuit must be in operation and thus requires to be powered. To overcome this disadvantage, it has been provided to modify the waveguides or the coupling gratings to be able to obtain an alignment signal during setting periods, but this complicates the manufacturing and risks disturbing the normal operation of the optical circuit.

U.S. Pat. No. 7,024,066 provides adding to an integrated optical circuit structure a specific grating intended for a positioning.

More specifically, as shown in top view in FIG. 2A and in cross-section view in FIG. 2B, this patent provides adding to an integrated optical circuit 41 comprising a functional grating 42 intended to introduce light into a submicronic waveguide 43 coupled with circuits elements, not shown, an additional grating 44 of Littrow grating type. As shown by the top view of FIG. 2B, the integrated optical circuit is formed on a substrate 46 and comprises submicronic waveguides 43 between two cladding layers 47 and 48. Littrow grating 44 is added on the upper surface of upper optical cladding 48. This US patent provides positioning an optical fiber 49 on Littrow grating 44 and the distance between gratings 44 and 42 is known by construction, displacing the optical fiber by the known distance separating positing grating 44 from functional grating 42.

However, this method, although it enables to position the fiber, does not enable to align it, that is, to adjust its orientation according to the optimal angle to be provided between the fiber and the functional grating. This method only enables to roughly adjust the alignment between an optical fiber and a grating associated with a functional waveguide. Indeed, for example for a 1,550-nm wavelength and a typical 10% manufacturing tolerance for the critical dimensions of the guide and of the grating, the coupling angle may vary by from 6° to 19° while the nominal value is 13°. The fiber/grating coupling rate falls by 1 dB (20%) for an angle variation of only 3 degrees. This is a first reason for which the use of a Littrow grating does not enable an alignment, but only a prepositioning: the Littrow grating will never have the same characteristics as the functional coupling gratings, this grating itself having variable characteristics. Further, even as concerns the positioning, the Littrow grating is manufactured on a different layer by masking operations different from those of functional gratings. The positioning tolerances are thus not strict and identical.

SUMMARY OF THE INVENTION

There is a need for a device and a method enabling to align an optical fiber and a submicronic waveguide associated with an optical circuit, independently from the integrated optical circuit and from its operation.

Grating coupling devices between an optical fiber and the submicronic waveguide of the type shown in FIG. 1 will be more specifically considered herein. Indeed, this type of grating coupling device especially enables to introduce light into a waveguide before dicing of a wafer comprising a large number of integrated optical circuits into individual chips.

An object of the present invention is to provide a reference grating for the alignment of an optical waveguide which does not have the disadvantages of known devices.

An object of the present invention is to provide a manufacturing method requiring no additional steps with respect to conventional methods.

Thus, an embodiment of the present invention provides an integrated optical circuit comprising a submicronic operational waveguide associated with an operational grating intended for the coupling with an optical fiber, further comprising an alignment grating, identical to the operational grating, associated with a blind waveguide and arranged at a known distance from the operational grating.

According to an embodiment of the present invention, the operational grating and the alignment grating result from same manufacturing steps.

According to an embodiment of the present invention, the constitutive materials essentially are silicon and silicon oxide.

According to an embodiment of the present invention, reflective means are provided at the end of the blind waveguide.

According to an embodiment of the present invention, one or several operational gratings on the same line as two surrounding alignment gratings are provided.

An embodiment of the present invention provides a device for aligning an integrated optical circuit, comprising means for aligning an optical fiber on the alignment grating; and means for displacing the optical fiber with respect to the circuit, while keeping its orientation, by the known distance between the alignment grating and the operational grating.

According to an embodiment of the present invention, the alignment means comprise means for detecting the light reflected by the alignment and maximum determination grating.

According to an embodiment of the present invention, the displacement means are automated.

An embodiment of the present invention provides a method of alignment between a submicronic operational waveguide associated with an operational coupling grating and an optical fiber, comprising the steps of:

providing an alignment grating substantially identical to the operational grating and coupled to a blind waveguide, the alignment grating being arranged at a known distance from the operational grating;

aligning an optical fiber on the alignment grating by maximizing the light reflected by the blind waveguide to the optical fiber; and displacing the optical fiber while keeping its orientation by the distance between the alignment grating and the operational grating.

According to an embodiment of the present invention, a step of attachment of the optical fiber placed in final position to the integrated optical circuit is provided.

According to an embodiment of the present invention, the alignment method is implemented between a reference structure and a test structure.

According to an embodiment of the present invention, a method for aligning, on an integrated circuit comprising one or several operational gratings on the same line as two surrounding alignment gratings, an assembly of optical fibers separated by the same distance as the various gratings and assembled in a support maintaining their ends parallel is provided, wherein the two end fibers are aligned on the two end alignment gratings, whereby an accurate positioning of the intermediary fibers on the operational gratings is directly obtained.

The foregoing objects, features, and advantages of the present invention will be discussed in detail in the following non-limiting description of specific embodiments in connection with the accompanying drawings.

BRIEF DESCRIPTION OF THE DRAWINGS

FIG. 1, previously described, illustrates a grating coupling structure between an optical fiber and a submicronic waveguide;

DETAILED DESCRIPTION

As usual in the representation of integrated optical circuits, the various drawings are not to scale.

Figure 2A:
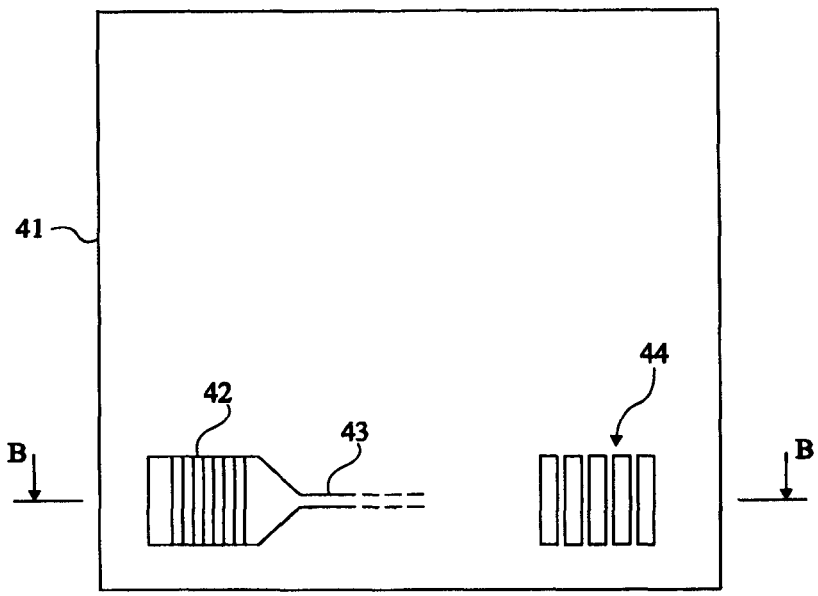
FIGS. 2A and 2B, previously described, illustrate a method for positioning an optical fiber using a reference grating.
Figure 2B:
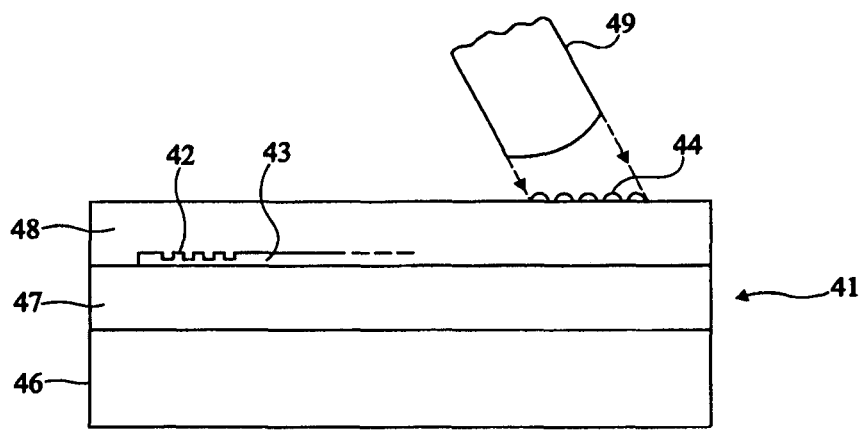
Figure 3A:
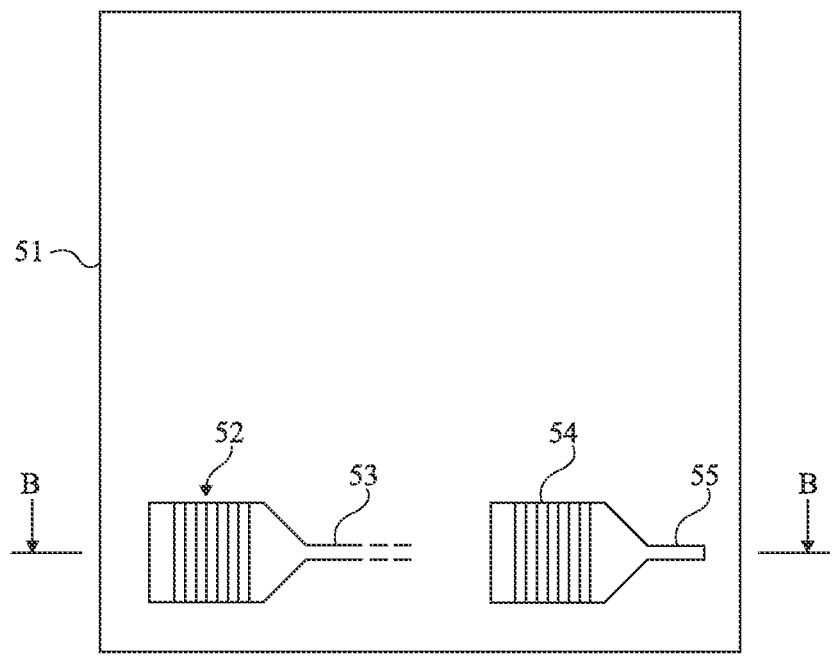
FIGS. 3A and 3B illustrate a method for aligning an optical fiber using a reference alignment structure according to an embodiment of the present invention.
Figure 3B:
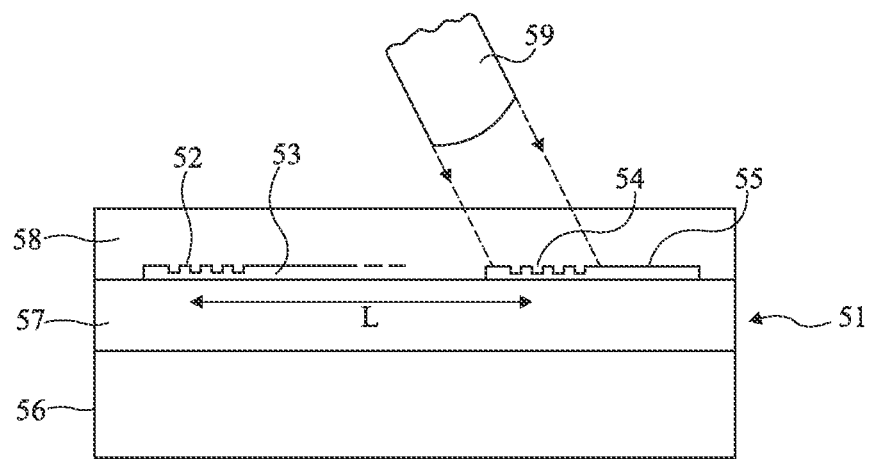

FIGS. 3A and 3B are a top view and a cross-section view of an embodiment of a method for aligning an optical fiber on a submicronic waveguide using a grating coupling and a specific alignment grating.

FIG. 3A shows a chip of an integrated optical circuit wafer 51 comprising a coupling grating 52 between an optical fiber (not shown in FIG. 3A) and a submicronic waveguide 53 coupled with active devices, not shown. An alignment structure comprising an alignment grating 54, preferably identical to coupling grating 5, coupled to a blind waveguide 55, that is, a guide having an abruptly stopping core, is further provided. Typically, the core ends on a planar surface perpendicular to the propagation axis in the guide core. After this planar surface, the medium has a refractive index different from that of the core (advantageously lower, to increase the reflection rate). Different alternative blind waveguides are indicated hereafter.

As shows by the cross-section view of FIG. 3B, the integrated optical circuit chip is formed on a substrate 56 and especially comprises the grating and optical waveguide structures 52, 53, 54, 55 in a guide layer 52, 53, 54, 55 formed between two cladding layers 57 and 58. An optical fiber 59 is aligned on alignment grating 54. This alignment is possible since the light sent by the grating into blind waveguide 55 is reflected at the end of this blind waveguide and is sent back into the optical fiber. Various means may be provided to capture the reflected beam and position and orient the fiber with respect to the wafer to make the detected intensity maximum. For example, part of the returned light will be collected by means of a splitter or another coupler to send it to a photodetector, for which a maximum will be searched.

The optical fiber can thus be very accurately aligned on alignment grating 54. Then, given that the alignment grating is formed in the same layer and with the same techniques as functional gratings such as grating 53, it will be possible to accurately displace the optical waveguide without modifying its orientation so that it is coupled with functional grating 52. The displacement between the waveguide and the wafer is a relative motion and the wafer can thus be displaced with respect to the waveguide. Of course, such displacements will be automated based on the circuit design data. This is due to the fact that the two gratings are identical and made at the same time (advantageously). Indeed, given that the alignment grating(s) and the functional gratings have the same characteristics, there is the same positioning tolerance, and the optimal coupling conditions are thus identical on all alignment axes and this, whatever the manufacturing tolerances.

After the alignment and test steps, once the optical fiber has been positioned in front of an operational grating, it may be provided to attach the optical fiber placed in final position and the integrated optical circuit, preferably with a glue of same index as the fiber.

Of course, the drawing is not to scale and the gratings actually take up a smaller surface area of the integrated optical circuit than has been shown. Further, a diced integrated optical circuit chip has been shown. In practice, the positioning and alignment operations may be performed before the dicing of a wafer into chips. This especially enables to analyze test structures, for example, arranged in the wafer dicing areas.

On the other hand, a specific embodiment of an optical waveguide comprising a guide layer of given index between two cladding layers of different indexes has been shown and described. Many materials for making such guide structures are known and other types of optical waveguides which may also advantageously be used without departing from the field of the present description are known. For example, the guide core will be made of silicon, InP, phosphorus- or boron-doped silica, germanium or silicon nitride. The coating forming the optical cladding may be made of silica, phosphorus- or boron-doped silica, germanium, silicon nitride, silicon oxide, air, etc.

Figure 4:
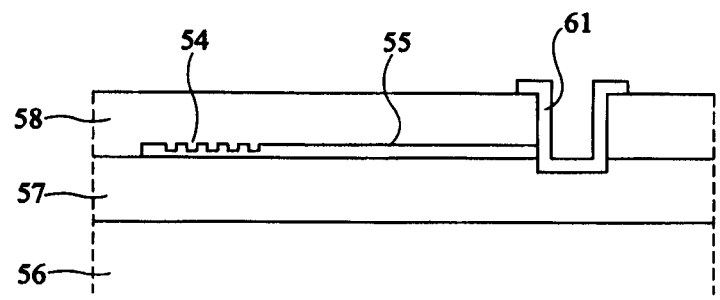
FIG. 4 shows an alternative embodiment of an alignment reference structure.

FIG. 4 is a cross-section view illustrating a specific structure of alignment 54 associated with a blind waveguide 55 such as described hereabove. To increase the amount of light reflected by this blind waveguide, its end may be made more reflective, for example by the forming of an opening in the upper cladding layer 58 at the level of this end and, advantageously, by the coating of this opening with a metal layer 61, which improves the wave reflection coefficient. Many other means may be provided to increase this reflection at the end of the blind waveguide. A structure of Bragg mirror type, such as described in publication: "Ultracompact silicon-on-insulator ridge-waveguide mirrors with high reflectance" by P. Velha, JC Rodier et al. published in Applied Physics Letters, volume 89, Issue 17, id. 171121, may for example be formed.

Figure 5:
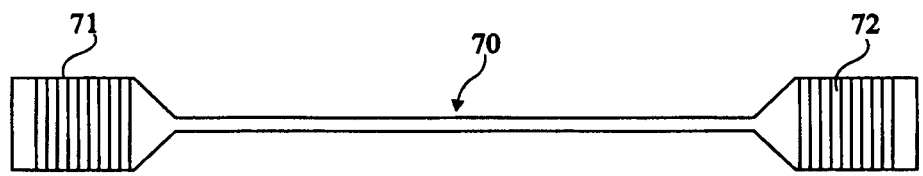
FIG. 5 illustrates a test method according to prior art.
Figure 6:
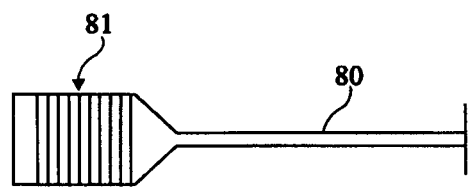
FIG. 6 illustrates a test method using an embodiment of the present invention.

FIGS. 5 and 6 are intended to illustrate an advantage of the structure according to the present invention.

Conventionally, when propagation losses in waveguides formed on an integrated optical circuit are desired to be formed, coupling gratings 71 and 72 are formed at the two ends of a test waveguide 70. Light is injected into grating 71 and the detected light is analyzed in grating 72. Such measurements are known to be delicate since they measure not only the attenuation of waveguide 70, but also the coupling failures between input and output optical fibers and input and output gratings 71, 72.

As illustrated in FIG. 6, to perform such a measurement with a greater accuracy, the previously-described technique using a reference grating associated with a blind waveguide such as may be used. For this purpose, a waveguide 80, of sufficient length to enable propagation measurements, has a blind end, preferably made reflective as described in relation with FIG. 4. Thus, by injecting light from a single waveguide into a single input grating 81, the attenuation due to a round travel within waveguide 80 can be accurately measured. This type of measurement has the advantage that, to measure a given attenuation, only a waveguide 80 half as long as conventionally-used waveguide 70 is needed.

The present invention is likely to have various alterations and modifications. Several alignment gratings and several coupling gratings may in particular be provided. It may especially be provided to arrange on the chip one or several operational gratings on the same line as two alignment gratings which surround them. Correlatively, a row of optical fibers separated by the same distance as the various gratings is assembled in a support which maintains their ends parallel. Thus, by aligning the two end fibers on the two end alignment gratings, an accurate positioning of the intermediary fibers on the operational gratings is directly obtained.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for aligning an integrated optical circuit comprising a submicronic operational waveguide (53) associated with an operational grating (52) intended for coupling with an optical fiber, further comprising an alignment grating (54), identical to the operational grating, associated with a blind waveguide (55) and arranged at a known distance from the operational grating, said blind waveguide comprising a waveguide portion, the core of the waveguide portion being interrupted with the surrounding dielectric cladding, the device for aligning comprising:
   a circuit positioner that supports and controls movement of the integrated optical circuit; and
   an optical probe positioner that supports and aligns an optical fiber (59) on the alignment grating,
   wherein the circuit positioner and the optical probe position control movement of the integrated optical circuit and the optical fiber to displace the optical fiber with respect to the circuit, while keeping its orientation, by the known distance between the alignment grating and the operational grating.

2. The device of claim 1, wherein the integrated optical circuit essentially has silicon and silicon oxide as constitutive materials.

3. The device of claim 1, wherein the integrated optical circuit comprises reflective means (61) at the end of the blind waveguide.

4. The alignment device of claim 1, wherein the alignment means comprise means for detecting the light reflected by the alignment and maximum determination grating.

5. The alignment device of claim 1, wherein the displacement means are automated.

6. A method of alignment between a submicronic operational waveguide (53) associated with an operational coupling grating (52) and an optical fiber, comprising the steps of:
- providing an alignment grating (54) substantially identical to the operational grating and coupled to a blind waveguide (55), the alignment grating being arranged at a known distance from the operational grating;
- aligning an optical fiber on the alignment grating by maximizing the light reflected by the blind waveguide to the optical fiber; and
- displacing the optical fiber while keeping its orientation by the distance between the alignment grating and the operational grating.

7. The alignment method of claim 6, further comprising a step of attachment of the optical fiber placed in final position to the integrated optical circuit.

8. The alignment method of claim 6, implemented between a reference structure and a test structure.

* * * * *